May 14, 1957   L. C. STILES   2,791,827
METHOD OF FORMING A CLADDING PLATE
Filed June 6, 1951   2 Sheets-Sheet 2

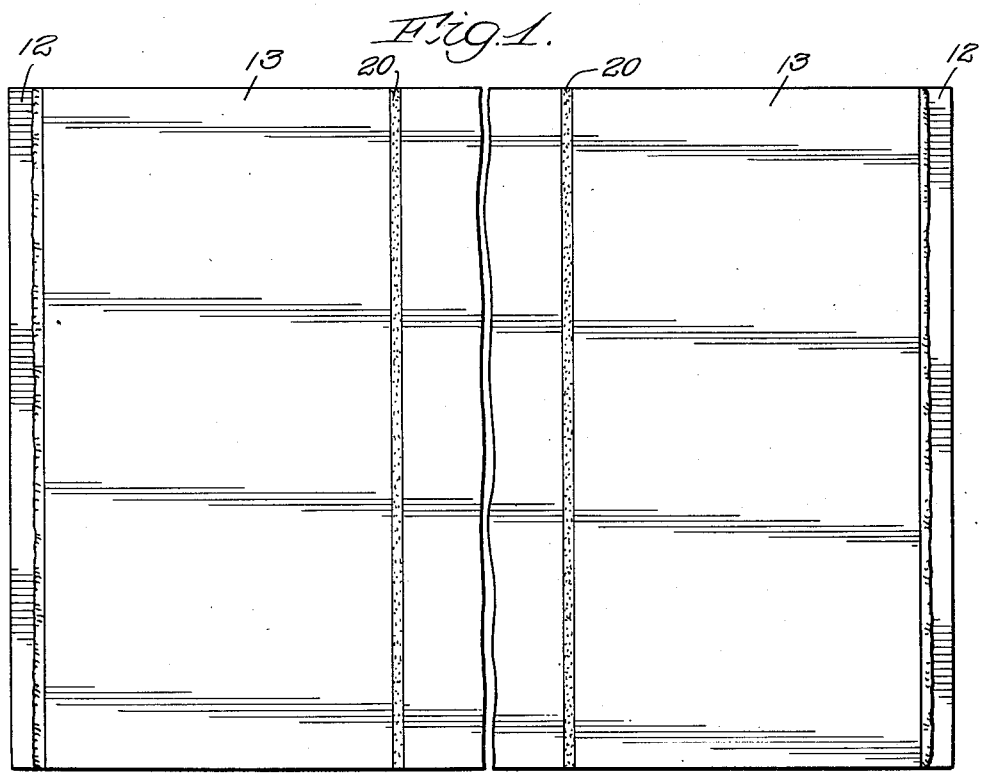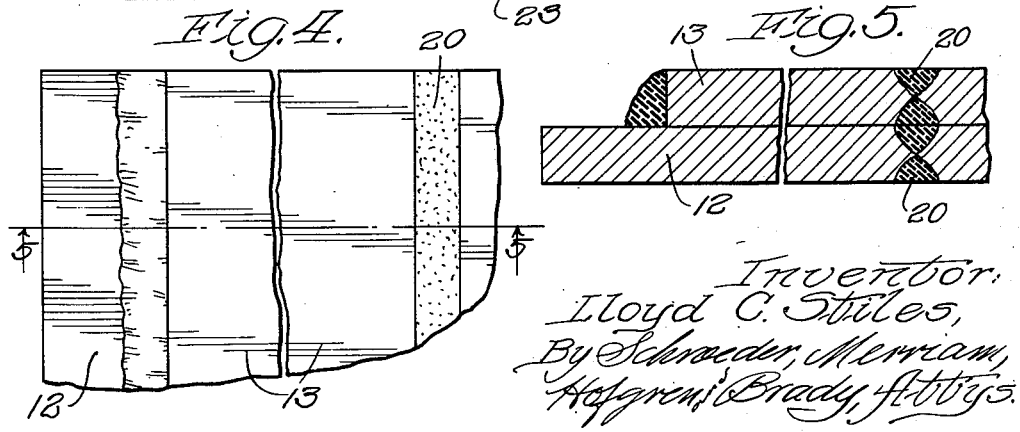

Inventor
Lloyd C. Stiles,
By Schroeder, Merriam,
Hofgren & Brady, Attys.

United States Patent Office 2,791,827
Patented May 14, 1957

2,791,827
METHOD OF FORMING A CLADDING PLATE

Lloyd C. Stiles, Birmingham, Ala., assignor to Chicago Bridge & Iron Company, a corporation of Illinois Application June 6, 1951, Serial No. 230,217

2 Claims. (Cl. 29—471.1)

This invention relates to a cladding sheet and a method of forming the same.

Reference is had to the co-pending applications of Robert L. Brown, Serial No. 87,262, filed April 13, 1950, now abandoned, and Serial No. 205,528, filed January 11, 1951, now abandoned; Robert C. Bertossa, Serial No. 201,465, filed December 18, 1950, now abandoned; Lloyd C. Stiles, Serial No. 207,949, filed January 26, 1951, now abandoned; Leonard P. Zick, filed April 7, 1951, Serial No. 219,837, now abandoned, and Lloyd C. Stiles and Robert C. Bertossa, filed May 5, 1951, Serial No. 224,808, now abandoned.

In the formation of clad materials in which a base plate or sheet is supplied with a cladding sheet or plate which is bonded thereto, for example, as by brazing as set forth in the aforesaid applications, it frequently happens that for economic reasons and because the cladding plates are often available on the market only in relatively small sizes it is necessary to use a cladding plate comprised of a number of small sections. For example, in forming a clad plate consisting of a base plate of ordinary mild steel, 7½ feet x 18 feet in area, cladding metal may only be available in plates 3 feet x 7½ feet. It has been suggested to lay these plates side by side; but under vacuum the brazing material has almost unbelievable penetrating properties and flows up through any gaps between the sheets, causing undesired bonding of the cladding material to surfaces to which it is not intended to be bonded. On the other hand, in the brazing method, it is necessary that the cladding sheet and the base sheet have parallel faces at all points so that the bonding material will bridge all gaps equally. When the individual cladding sheets are welded together along their edges, the welding introduces distortions which prevents, even with a vacuum between the cladding sheet and the base sheet, the necessary contact of the interfaces. The present invention is a method of overcoming the defects produced by welding in the cladding plates so produced.

The usual base plate is a mild steel of the usual structural type. The usual cladding material is an alloy steel, by which I mean in this application to cover nickel steels, stainless steels, Monel, and even nickel itself, the cladding usually being for the purpose of providing corrosion resistance or temperature resistance either at high or low temperatures.

In brief, the invention consists in welding aligned cladding plates at their edges to form a large composite cladding plate or sheet, and then plastically stretching the warped or kinked areas along the welded seams of the composite plate slightly beyond the yield strength of the metal to remove the stresses produced by the welding and again form a flat sheet which will remain flat during the heating incident to the brazing operation.

The invention is illustrated somewhat diagrammatically in the drawings in which:

Figure 1 is a plan view of a sandwich formed from a pair of assembled composite plates;

Figure 2 represents a cross-sectional view of the same sandwich;

Figure 3 is a sectional elevation through the same sandwich attached to a forming sheet and having a cover sheet over the sandwich;

Figure 4 is an enlarged fragmentary view of the upper left hand corner of Figure 1;

Figure 5 is a sectional elevation through the line 5—5 of Figure 4;

Figure 6:
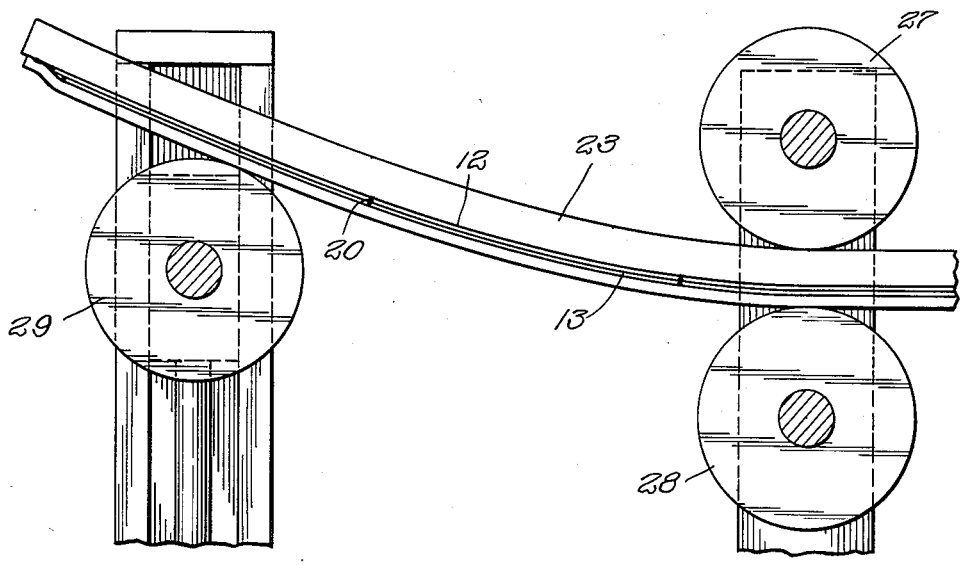
Figure 6 illustrates the first step in the plastic stretching operation, being a sectional elevation in diagrammatic form thereof.

Two composite clad plates 12 and 13 having a series of welded seams 20 are formed by aligning a number of small cladding plate sections in edge to edge relationship and welding along the edges on both sides of the plates while they are so aligned. It is to be noted that the welded seams 20 may be in any direction and similarly that the clad section may be arranged in a "crazy quilt" pattern. These clad plates have the same general dimensions except that one, plate 13, is slightly shorter than the other (plate 12). After grinding the welded seams substantially flush with the plate surface, the two cladding plates are placed one atop the other in face to face relationship and so aligned that the shorter plate 13 is centered atop the longer one 12 as shown in Figs. 1, 2, 4 and 5. The two plates are then welded together along both ends of the shorter plate but not along the sides. They are then sandwiched between a steel forming sheet 23 and a steel cover sheet 24 in face to face relationship as shown in Figs. 3 and 6. Whereas the forming sheet should be at least ⅜ inch thick and the cover sheet ¼ inch thick, both sheets are of the same linear dimensions being slightly longer than plate 12 but of the same width. The surfaces of both sheets must be clean to prevent scarring the cladding plates. The longer cladding plate is welded along its ends to the forming sheet and the cover sheet, located atop the shorter cladding plate 13, is tacked to the forming sheet. This assembly is then passed through pinch rolls 27, 28 and 29 of Fig. 6, and rolled to an arc having a radius of approximately 14 feet thereby stretching the cladding plates over the outside surface of the forming sheet slightly beyond their yield strength and eliminating the distortions along the welds. The assembly is straightened by first detaching at least one end of the cladding assembly from the steel forming sheet and then turning it over and again passing it through the pinch rolls. Upon removal from the rolls the two cladding plates are sheared, the ends trimmed and the cladding plates brazed to a base plate by the methods disclosed in the aforesaid applications.

Figure 7:
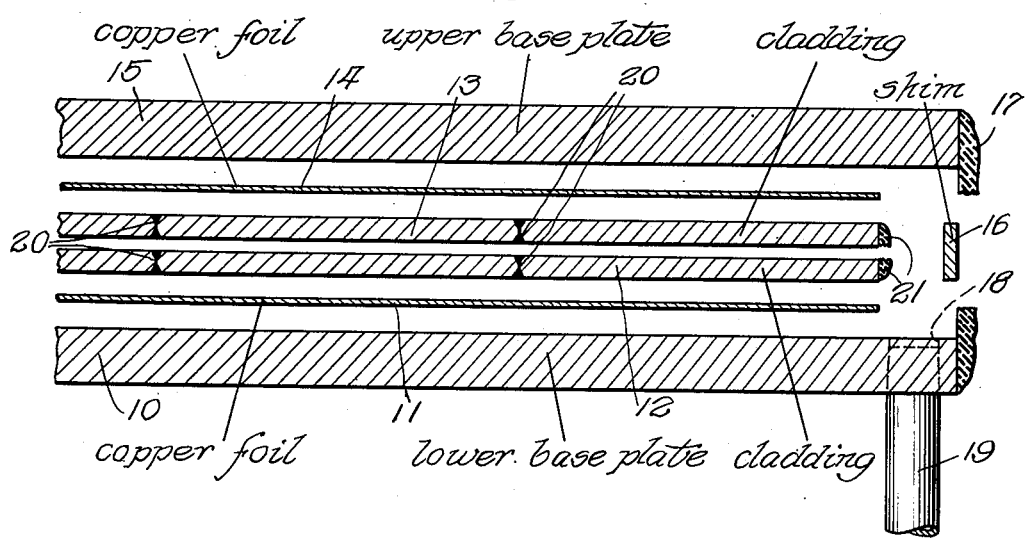
Figure 7 represents the completed assembly ready for brazing, this being a sectional side elevation in exploded form.

In the preferred brazing method, a sandwich is formed (Fig. 7) by assembling a lower base plate 10, a layer of brazing material 11, usually copper foil of slightly smaller dimensions than the base plate; a layer of cladding material 12 of the same general dimensions as the brazing material, a second layer of cladding material 13 of the same approximate area as the first, the two sheets or plates of cladding material being completely sealed together around their peripheries except for a slit or vent of one-quarter inch in length along the edge immediately adjacent an exhaust opening 18 for evacuating air. It is preferred that a film of separating powder such as aluminum oxide be used to coat the faces of the two cladding sheets which are common to each other. This coat may be applied prior to the stretching step or at the time of assembling the sandwich for brazing. Above the second cladding plate is a second layer of brazing metal 14 of the same area as the first and an upper base plate 15 of the same area as the lower base plate. It will be appreciated that the brazing material shown in Fig. 7 actually is immediately adjacent both the cladding plates and the base plates and that the two clad plates themselves are likewise in substantial contact. The drawing is shown in exploded form so that portions thereof may be identified more readily.

The base plates are held apart at their edges in a predetermined spaced relationship by shims 16 and the edges of the base plates are welded as at 17 to form a continuous hermetic seal. However, at least one outlet 18 is provided which is connected by a pipe 19 leading to a vacuum pump capable of maintaining the interior of the structure under substantial subatmospheric pressure during the brazing operation. Normally, the pressure should be below 18 inches of mercury absolute, and preferably should be close to 28 to 29 inches of mercury absolute.

After the sandwich has been formed, the cladding plates are brazed to the base plates by appropriate heating action and after cooling, the edges of the sandwich are sheared off to a point immediately within the weld 21 which binds the two clad plates together and there is thus produced two independent clad members.

Having described my invention in considerable detail, it is my intention that the invention be not limited by any of the details of description unless otherwise specified, but rather be construed broadly within the spirit and scope as set out in the accompanying claims.

I claim:

1. A method of forming a cladding plate of alloy steel comprising aligning a plurality of cladding plate sections in edge to edge relationship; welding adjacent edges to form a composite cladding plate having distortion areas; forming a sandwich comprising in successive layers in face to face relationship a forming plate, at least one composite cladding plate, and a cover sheet, each rigidly positioned with respect to the other; shaping the sandwich in the form of an arc, the arc radius being small enough to plastically stretch the composite plates slightly above their yield strength; flattening the sandwich, and separating the composite cladding plates from the sandwich.

2. A method of forming cladding plates of alloy steel comprising aligning a plurality of clad plate sections in edge to edge relationship; welding adjacent edges to form a composite cladding plate having distortion areas; forming an assembly comprising a metal forming sheet, a composite cladding plate center positioned atop the forming sheet in face to face relationship and slightly shorter than the forming sheet and welded along its ends to the forming sheet, a second composite cladding sheet slightly shorter than the first and welded to the first along its ends after being center positioned atop the other cladding plate, and a cover sheet having the same dimensions as the forming sheet being placed atop the second composite cladding plate and being welded to the forming sheet; rolling the assembly to form an arc having a radius small enough to plastically stretch the composite cladding plates slightly above their yield strength, the welds of the composite cladding plates being substantially parallel to the axis of arc curvature; detaching at least one end of the cladding assembly comprising the first and second cladding plates from the forming sheet flattening the assembly; and separating the composite cladding plates from the assembly.

References Cited in the file of this patent
UNITED STATES PATENTS

| | | |
|---|---|---|
| 219,646 | Murray | Sept. 16, 1879 |
| 426,059 | Planchamp | Apr. 22, 1890 |
| 967,146 | Simpson | Aug. 9, 1910 |
| 1,021,662 | Cox | Mar. 26, 1912 |
| 1,152,610 | Bats | Sept. 7, 1915 |
| 1,582,571 | Budd | Apr. 27, 1926 |
| 1,718,746 | Lougheed | June 25, 1929 |
| 1,798,190 | Carter et al. | Mar. 31, 1931 |
| 1,886,615 | Johnson | Nov. 8, 1932 |
| 1,904,241 | Kammerer | Apr. 18, 1933 |
| 1,915,913 | Anderson | June 27, 1933 |
| 1,958,146 | Kelley | May 8, 1934 |
| 2,018,725 | Johnson | Oct. 29, 1935 |
| 2,023,354 | Cope | Dec. 3, 1935 |
| 2,038,305 | Mikaelson et al. | Apr. 21, 1936 |
| 2,142,109 | Burke | Jan. 3, 1939 |
| 2,158,799 | Larson | May 6, 1939 |
| 2,199,321 | Ostendort | Apr. 30, 1940 |
| 2,234,214 | Young | Mar. 11, 1941 |
| 2,269,523 | Deutsch | Jan. 13, 1942 |
| 2,284,504 | Wrigton | May 26, 1942 |
| 2,333,282 | Wilson | Nov. 2, 1943 |
| 2,390,452 | Mudge | Dec. 4, 1945 |
| 2,405,793 | Lohse | Aug. 13, 1946 |
| 2,441,858 | Watter | May 18, 1948 |
| 2,446,891 | Tower et al. | Aug. 10, 1948 |
| 2,450,339 | Hensel | Sept. 28, 1948 |
| 2,473,712 | Kinney | June 21, 1949 |
| 2,486,844 | Hercik | Nov. 1, 1949 |
| 2,503,597 | Rodder | Apr. 11, 1950 |
| 2,619,715 | Barr et al. | Dec. 2, 1952 |

OTHER REFERENCES

Metals Handbook, 1948 edition, page 355, published by The American Society for Metals, Cleveland, Ohio.